(12) United States Patent
Fröhlich et al.

(10) Patent No.: US 8,239,173 B2
(45) Date of Patent: Aug. 7, 2012

(54) SYSTEM FOR THE COMPUTED-AIDED DESIGN OF TECHNICAL DEVICES

(75) Inventors: Martin Fröhlich, Berlin (DE); Frank Neumann, Berlin (DE); Armin Ortmann, Berlin (DE); Torsten Thiele, Berlin (DE)

(73) Assignee: Pace Aerospace Engineering and Information Technology GmbH, Berlin (DE)

( * ) Notice: Subject to any disclaimer, the term of this patent is extended or adjusted under 35 U.S.C. 154(b) by 445 days.

(21) Appl. No.: 11/990,531

(22) PCT Filed: Aug. 10, 2006

(86) PCT No.: PCT/EP2006/065222
§ 371 (c)(1),
(2), (4) Date: Dec. 31, 2009

(87) PCT Pub. No.: WO2007/020231
PCT Pub. Date: Feb. 22, 2007

(65) Prior Publication Data
US 2010/0106466 A1     Apr. 29, 2010

(30) Foreign Application Priority Data

Aug. 18, 2005 (DE) .......................... 10 2005 039 646
Nov. 16, 2005 (DE) .......................... 10 2005 055 133

(51) Int. Cl.
*G06F 17/50* (2006.01)
(52) U.S. Cl. .......................................... 703/1
(58) Field of Classification Search ........................ 703/1
See application file for complete search history.

(56) References Cited

U.S. PATENT DOCUMENTS

| 5,822,206 | A | 10/1998 | Sebastian et al. |
| 6,625,507 | B1 | 9/2003 | Dickerson et al. |
| 7,847,807 | B2 * | 12/2010 | Stehle et al. .................. 345/619 |

(Continued)

FOREIGN PATENT DOCUMENTS

EP        1 182 527        2/2002

(Continued)

OTHER PUBLICATIONS

Sudhaker Y. Reddy et al., *Managing Function Constraints in Design Sheet*, Rockwell Science Center, Palo Alto, CA, Proceedings of DETC98; 1998 Design Engineering Technical Conferences; Sep. 13-15, 1998—Atlanta, Georgia.

(Continued)

*Primary Examiner* — Dwin M Craig
*Assistant Examiner* — Aniss Chad
(74) *Attorney, Agent, or Firm* — Ware, Fressola, Van Der Sluys & Adolphson, LLP

(57) ABSTRACT

The invention concerns an apparatus and a computer software product for the conceptioneering, predesign and configuration of a machine object represented by an object data model. Component objects are stored in an object database, wherein a component object contains at least one parameter object. In addition the database contains functional objects. The modeling approach implemented by the separation according to the invention of component objects and functional objects permits a distinction to be drawn between constraints within a component object and constraints which exist between component objects. The former are embraced by the component objects themselves and the latter by the functional objects. That encapsulation has in particular the advantage that the modeling process can be substantially clearer. In addition encapsulation permits re-use of the component objects in various systems.

23 Claims, 7 Drawing Sheets

U.S. PATENT DOCUMENTS

2005/0071135 A1 3/2005 Vredenburgh et al.
2006/0122999 A1* 6/2006 Sosnov et al. .................... 707/5

FOREIGN PATENT DOCUMENTS

| EP | 1 271 412 | 6/2002 |
| EP | 1 074 927 | 8/2002 |
| WO | WO 02/73468 | 3/2002 |
| WO | WO 02/073473 | 9/2002 |

OTHER PUBLICATIONS

Penoyer J.A. et al: "Knowledge based product life cycle systems: principles of integration of KBE an C3P" Computer Aided Design, Elsevier Publishers BV., Barking, GB, Bd. 32, Nr. 5-6, Mai 2000 (May 2005), Seiten 311-320, XP004194680, ISSN: 00110-4485.

Reddy S.Y. et al.: "Design Sheet: a system for exploring design space" Artificial Intellegence in Design '96, [Online] 1996, Seiten 1-20, XP002417480 as published on the Internet: URL:http://www.rsc.rockwell.com/designsheet/aid96.pdf.

Gao J.X. et al., "A product data management integrated product configuration and assembly process planning environment" [Online] 2002, Seiten 1-22, XP002417418; as published on the Internet: URL:http://dspace.lib.cranfield.ac.uk:8080/bitstream/1826/1048/1/lmech-Product+data-Gao+Paper+2.pdf.

"PDM Enablers V2.0 Convenience Document, chapter 12, PdmVariantManagementModule" Internet Citation, [Online] Aug. 2001, XP002382897, as published on the Internet URL:http://www.omg.org/docs/mfg/01-08-07 .pdf>[gefunden am May 29, 2006].

* cited by examiner

SYSTEM FOR THE COMPUTED-AIDED DESIGN OF TECHNICAL DEVICES

CROSS REFERENCE TO RELATED APPLICATIONS

This application is for entry into the U.S. national phase under §371 for International Application No. PCT/EP2006/065222 having an international filing date of Aug. 10, 2006, and from which priority is claimed under all applicable sections of Title 35 of the United States Code including, but not limited to, Sections 120, 363 and 365(c), and which in turn claims priority under 35 USC §119 to German Patent Application No. 10 2005 039 646.1 filed on Aug. 18, 2005, and German Patent Application No. 10 2005 055 133.5 filed on Nov. 16, 2005.

BACKGROUND OF THE INVENTION

1. Technical Field

The invention concerns an apparatus for the conceptioneering or configuration of a machine object which is represented by an object data model.

2. Discussion of Related Art

Complex technical products require a complicated and expensive development procedure. A large number of parameters, which can scarcely be readily managed by an individual engineer influence the product configuration which is to be optimized in regard to technical and economic aspects. As an example mention may be made of the conceptioneering and configuration of new aircraft.

The design process can be roughly divided into the following phases:

a) Conception Phase

In the conception phase for the design of a technical product, product concepts are defined, essential configurational parameters of the concepts are hardened into a provisional product design, feasibility studies are carried out, simulations of the product and various analytical methods are applied in order to test which product concept is worth the expense of further development. As an example of the development of a new passenger aircraft, in this phase for example fuselage and wing shapes are defined. The conception phase goes into a predesign phase in which predesigns of the product are developed with the methods of the conception phase.

b) Design Phase

Then more detailed designs of the product are developed in the design phase, three-dimensional test models are built or VR-models (VR is the abbreviation for virtual reality) are constructed and tested. That phase generally involves using CAD-systems (standing for computer aided design).

c) Configuration Phase

In the subsequent configuration phase details of the product are conceptioneered and planned. As an example of the development of a new passenger aircraft, in this phase the equipment and fittings of the passenger cabin are defined for a given buyer for the aircraft. In that procedure electronic catalogues are drawn up, drawings and documents are produced and interfaces are provided with a life cycle management. The life cycle management concerns is methods of planning and controlling a supply for the manufacturer of the product with the required components and spare parts as well as the provision of product-related services.

d) Documentation Phase

In the documentation phase which concludes the product development procedure the necessary technical publications are produced, the enterprise structures required for production are planned, structures are set up for supporting modifications on the product (retrofit support) and a lifecycle documentation is produced.

The present invention concerns development processes in the phases a), conception, or c), configuration.

Apparatuses with software integration platforms are known for support and aid for the conception phase, which integrate different software tools which are already available in order to speed up the conception process by an automated data exchange between those tools. Known software integration platforms are for example Isight (Release 9.0) or the web-supported product FIPER (Version 1.6).

The software platforms include an interface by way of which various software tools are integrated. Different interface types are known. The spectrum ranges from an application call with a file-supported communication for data exchange by way of network-like communication protocols, to tailor-made encoding of special application interfaces (API).

The disadvantage of such software integration platforms is that, with the integrated software tools, they also import their limitations and drawbacks. In addition such software integration platforms do not permit implementation of analysis methods which are to be newly created.

A second variant of known design systems for support for the conception phase is formed by what are known as KBE platforms. The term knowledge-based engineering (KBE) describes technologies for the definition and integration of engineering knowledge in product development. By means of KBE continuously recurring procedures can be expressed in rules which for example can be made available on an enterprise-wide basis. Such construction rules represent so-to-speak the expert knowledge of the enterprise.

Examples of KBE platforms with integrated CAD functionality are the products CATIA, Version 5 and UGS Knowledge Fusion. A disadvantage of both products is that the embedding of knowledge in the system is not effected in a unitary fashion. Depending of the respective specific context either rule-based definition techniques and checking mechanisms are used for activation of the rules, or script interfaces such as VisualBasic or C++ programming interfaces are made available. That differing knowledge implementation however can have the result that heterogeneous architectures which can be poorly scaled are created. Furthermore from just a low level of complexity of the methods and rules to be applied even software solutions produced have to be incorporated by means of an API. The integration of more complex methods and rules is possible only by means of a complicated and expensive software development procedure and remains so-to-speak "manual work".

A further known product is "DesignSheet" from Rockwell Scientific. DesignSheet pursues the aim of analysis of conceptional designs. Such designs are defined by variables and boundary conditions (referred to as constraints). Algebraic equations which are symbolically defined at a user interface in DesignSheet are used as constraints. DesignSheet presupposes that equations are explicitly present or inputted in symbolic form and can be resolved symmetrically in accordance with each variable involved. That signifies a limitation on usability of DesignSheet because in practice constraints are frequently based on analysis functions which are implemented in a programming language. Furthermore functions define non-symmetrical, that is to say directed constraints (directed from input to output) so that resolution in accordance with the output of a function is simple but in accordance with the inputs it is difficult and is possible only numerically but not symbolically. DesignSheet is further limited to the analysis of conceptional designs.

A KBE application is also the subject-matter of WO 02/073473 A1 concerning an apparatus and a process for configuration of the interior of vessels, in particular aircraft. With that process, a user calls up a given type of aircraft and can then modify the configuration by way of symbolic inputs by means of a graphical user interface. In that respect the reliability of the modifications carried out is safeguarded in regard for example to requirements of government authorities by implemented monitoring processes and is displayed in a violation situation. A disadvantage of that apparatus is on the one hand its limitation to the task of configuration. On the other hand the apparatus limits the user to a fixed repertoire of predefined modification options in respect of a respective type of aircraft.

The technical object of the present invention is therefore that of providing an apparatus for the conceptioneering of a machine object, using an object data model in the form of an equation system which affords unitary embedding of engineering knowledge in the apparatus and allows it with a particularly high level of flexibility to use data models of machine components and objects as well as construction rules in the conceptioneering of different machine objects.

The apparatus according to the invention for the conceptioneering or configuration of a machine object using an object data model which for example can be represented by an equation system according to the invention. Preferred embodiments of the apparatus according to the invention are defined by the claims appended thereto.

The apparatus according to the invention for the conceptioneering, predesign and configuration of a machine object which is represented by an object data model has an object database which contains component objects in the form of component data models. A component object or component data model has in a simple form a parameter object or a plurality (in the context of this application to be interpreted in the sense of "multiplicity") of parameter objects which can assume a numerical or a non-numerical parameter value from a respectively predetermined range of values. Numerical parameter values are for example numbers of the double or floating type or units-related values. Non-numerical parameter values are for example data structures of the array or string type, or discrete variables, for example of the integer type, but can also be formed by geometry objects or component objects themselves. A particularly preferred embodiment contains parameter objects in the form of units-related physical values. Component objects therefore encapsulate the component-specific engineering knowledge in respect of the parameters, in which respect in preferred embodiments in addition the relationships between the parameters are also detected by formula objects and the geometry of the component objects.

The object database of the apparatus according to the invention further includes functional objects. A respective functional object is adapted to form a predetermined link between two or more parameter objects of different component objects, to modify parameter values which are contained in a component object, to add a component object to the object data model and to set parameter values of the added component object or to remove a component object from the object data model. Accordingly in the apparatus according to the invention functional objects form design-strategic engineer know-how which drives the respective stage of a design procedure forward and analyses a product status which has been respectively achieved.

The modeling approach implemented by the separation according to the invention of component objects and functional objects permits a distinction to be drawn between boundary conditions, referred as constraints, within a component object (for example the value of a non-variable parameter object) and constraints existing between components. The former are acquired by the component objects themselves and the latter by the functional objects. That encapsulation has in particular the advantage that the modeling process can be of a substantially clearer nature. In addition encapsulation permits re-use of the component objects in various machine objects and also in different technical systems such as for example different types of aircraft. That considerably increases the design configuration freedom on the part of the user and releases the tie to respective fixedly predetermined systems as is known from WO 02/073473 A1 in the form of aircraft interior designs which are fixedly related to a type of aircraft (aircraft interior design, abbreviated to AIC).

The apparatus according to the invention further includes a model formation unit which is connected to the object database and which is adapted in response to the input of a corresponding instruction to produce a component object instance of a component object contained in the object database or a functional object instance of a functional object contained in the object database and add same to an object data model. In addition the model formation unit is adapted in response to the input of an instruction for linking different component objects together or component objects to functional objects to correspondingly modify the object data model and in response to the input of a corresponding instruction to characterize a parameter object as an input parameter or output parameter of a resolution process. By using the model formation unit, the user of the apparatus according to the invention can generate an object data model, in which respect access is had to the component and functional objects formed by the object database.

In addition the apparatus according to the invention includes an execution unit which is connected to the model formation unit and to the object database and which is adapted in response to the input of a corresponding execution instruction to execute a functional object instance contained in the object data model with modification, addition or cancellation of object components, which are linked thereto, of the object data model.

The apparatus according to the invention is in a position, by executing suitably defined functional objects, to analyze, supplement or modify a current design stage of an object data model. The above-mentioned advantages of the object structures according to the invention in the object database make it possible to automatically research the range extending in a respective design stage of alternative designs, with the execution of functional objects, for determining a respectively suitable design.

DISCLOSURE OF THE INVENTION

Embodiments by way of example of the apparatus according to the invention are described hereinafter. The embodiments can be combined together.

Particularly preferably the apparatus according to the invention includes a resolution unit which is connected to the model formation unit and to the object database. The resolution unit is adapted:
  on the basis of the component objects and functional objects and the connections thereof in the object data model to produce an equation system having a first number of equations and a second number of parameter objects linked by the equations, to partition the equation system of the object data model into a number of subequation systems with a respective subamount of equations for a respective subamount of parameter objects, when there is a sufficiently defined equation system to produce a resolution plan which includes a sequence of resolution steps for ascertaining the output parameters of the equation system of the object data model, to process the resolution plan for the equation system resolution step by resolution step, wherein the processing of a respective resolution step includes calculation of a solution to a respective subequation system by evaluation of mathematical functions or application of one or more numerical calculation algorithms, and to output the ascertained values of the output parameters.

In terms of its usability that apparatus embraces a range of design stages which is not achieved in the extent thereof by known apparatuses and which embraces conceptioneering, predesign and configuration of machine objects. It therefore becomes possible to use a design tool for many different design stages. Accordingly, the problems which arose hitherto in terms of compatibility between data formats of different applications in conceptioneering, predesign and configuration disappear. That is made possible by the above-discussed structure according to the invention of the component objects and functional objects. The resolution unit adopts that structure immediately upon ascertaining the connections between the parameters contained in the object data model. That ascertaining operation is greatly simplified in relation to known resolution systems. A user does not have to effect symbolic input of equations, as is known from the product DesignSheet.

Preferred embodiments are described hereinafter, concerning particularly advantageous structures of the component objects contained in the object database. The embodiments can be combined together, in which case their advantages become cumulative.

In a further embodiment a parameter object, contained in the object database, of a component object is formed by a further component object with at least one further parameter object. Preferably a component object contained in the object database additionally contains a structure object which contains a list of the further component objects contained in the component object. The hierarchical structure of the component objects corresponds to the situation which is to be encountered in real life, in the design of complex systems, that they are composed of separable components.

In a further embodiment a component object contained in the object database additionally contains at least one formula object which is adapted to form a predetermined mathematical link between two or more parameter objects of the component object. This embodiment implements functional constraints within a component object in the form of the formula objects. Formula objects are therefore different from the functional objects in that they do not provide any connection of a component object to an external component object but provide connections solely within one and the same component object. That structure affords additional options in regard to forming constraints and at the same time enhances the encapsulation of the constraints, which is already applied due to the separation of component objects and functional objects.

In a further preferred embodiment a component object contained in the object database additionally contains at least one method object which is adapted to check the compliance of a relationship between parameter objects of the component object and in dependence on the checking result to set a value of at least one of the parameter objects embraced by the component objects in accordance with a predetermined rule or to add a new component object or subcomponent object to an object data model. Subcomponent objects form all objects contained in the object component, in particular parameter objects, formula objects, method objects, geometry objects and structure objects. Method objects therefore represent design knowledge in relation to a given component object. They can include complex decisions or condition-related operations. They are called up in particular from formula objects in order to associate a value with a parameter object or in order to generate new component object structures. Method objects can be implemented for example in the form of complex, multi-line C++ methods.

In another embodiment which concerns the configuration of the object database of the apparatus according to the invention the object database additionally contains at least one rule object which is adapted to check the object data model or a component object or subcomponent object contained therein or the parameter values thereof in terms of compliance of a defined constraint. Rule objects involve design, manufacturing, customer or production certification requirements which are to be fulfilled by the machine object. In a configuration thereof, rule objects are limited to more complex requirements which go beyond a mere comparison of parameter objects.

Embodiments which have particularly advantageous user interfaces are described hereinafter.

In an embodiment the model formation unit is connected to a graphical user interface and includes a graphics unit. The graphics unit is adapted to produce or modify a graphic representation of the object data model on the basis of instructions received by way of the graphical user interface. The graphic representation has a respective predetermined graphic element for each component object, each formula object and each rule object of the object data model as well as each connection between them. The graphics unit is further preferably adapted to output the graphic representation to the graphical user interface. In this embodiment by way of the graphical user interface a user can graphically produce an object data model as a mathematical model without the requirement for symbolically inputting the equations of the system. The mathematical system is represented graphically, for example in the form of blocks joined by lines. Graphic manipulation operations on those blocks for example by actuating a computer mouse modify the mathematical model as an outcome. Production of the mathematical equation system is automatically implemented by the resolution unit.

In a further embodiment the graphics unit is adapted to produce a graphic representation of a number of functional objects and component objects contained in the object database and output them to the graphical user interface, and to output a graphic representation of the object data model, which reflects all component objects contained therein and a component object hierarchy defined by the structure objects contained in them. In this embodiment a user can particularly clearly recognize the component structure of the machine object in the design and supplement it or modify it by graphic manipulation operations.

In a further preferred embodiment the resolution unit contains a resolution diagnosis unit which is connected to the graphical user interface and which is adapted to ascertain whether the object data model is sufficiently defined for the calculation of a solution, when an under-defined subequation system is present to ascertain a parameter object which is characterized neither as an input parameter nor as an output parameter, and to produce a diagnosis message which identifies the ascertained parameter object and to output it for display at the graphical user interface.

This embodiment has the advantage that possible solutions to which the user is referred by the diagnosis message are ascertained for rectifying the under-definition of the mathematical model. He can then reduce or eliminate the under-definition by setting the ascertained parameter object as an input parameter and by determining the parameter value. The diagnosis message preferably contains all objects contained in the under-defined subsystem. Both equations and also parameters can occur in the diagnosis message, depending on the respective diagnosis.

It is also possible to proceed in a similar fashion if there is an over-defined equation system or subequation system. In a further embodiment therefore the resolution diagnosis unit is additionally adapted, when there is an over-defined subequation system, to ascertain at least one over-defined parameter object and to produce a diagnosis message which identifies the ascertained parameter object, and to output same to the graphical user interface. The diagnosis message preferably contains all objects contained in the over-defined sub system. Both equations and also parameters can occur in the diagnosis message, depending on the respective diagnosis.

An intuitive graphic output of the diagnosis by the resolution diagnosis unit is implemented in an embodiment in which the resolution diagnosis unit is adapted to additionally identify in the diagnosis message at least one further parameter object linked to the ascertained parameter object and to output it to the graphics unit, and in which the graphics unit is adapted to produce a graphic representation of the ascertained parameter object, the further parameter object and the connection thereof and to output same to the graphical user interface for joint representation with the diagnosis message. In that way a graphic representation of all objects contained in the respective under-defined or over-defined sub system, that is to say equations, parameters and the connecting links thereof, can be produced and outputted.

Described hereinafter are further embodiments which allow the user to analyze the object data model and a mathematical model linked thereto in the form of an equation system by suitable output to the graphical user interface.

In an embodiment a component object contains a geometry object in the form of a set of geometry parameters which have items of information about a geometrical form associated with the first parameter object. The graphics unit is adapted on the basis of the input parameter values and the ascertained output parameter values of an object data model to determine values of the geometry parameters of all parameter objects and to produce a model graphic which corresponds to the geometrical form of the machine object with the ascertained geometry parameters. An intuitive graphic representation of the machine object is made available for the user in that way.

Preferably the graphics unit is additionally adapted to produce and output an impact graphic which contains a graphic representation of all component objects, formula objects and rule objects which are directly or indirectly linked to a parameter object which can be selected by way of the user interface. In that way, which other objects are influenced by the selected parameter object is ascertained and represented to the user.

In a further embodiment the graphics unit is additionally adapted to produce an output a computation graphic which contains a graphic representation of all component objects, formula objects and rule objects which are directly or indirectly involved in the calculation of a parameter value of a parameter object which can be determined by way of the user interface as an output parameter. That permits the user a visual and thus fast and effective analysis of the influence of other objects on a selected parameter object.

Graphic diagnosis methods are also provided in preferred embodiments in regard to solving the equation system derived from the object data model. Preferably the resolution unit has a solver diagnosis unit which is adapted during the processing of a resolution step to monitor the convergence of a solution to the subequation system in question to a convergence value, and in the absence of convergence to break off processing of the resolution step and to output a diagnosis message identifying the subequation system in question.

When testing different variants by altering input parameters an embodiment of the apparatus according to the invention which is found to be particularly fast in comparison with known apparatuses is one in which the resolution unit is additionally adapted after an output of the ascertained values of the output parameters, upon the application of an altered input parameter set, for the object data model, to ascertain altered input parameters of the input parameter set at the instruction interface and then to produce a part-resolution plan which in comparison with the previously produced resolution plan contains only those resolution steps which concern subequation systems, the resolution of which directly or indirectly depends on the altered input parameter or parameters. With this embodiment therefore it is not necessary for the entire resolution process to be repeated, with the altered input parameter values. Rather, only those steps of the resolution process which are influenced by the altered input parameter values are ascertained and carried out. In that way input parameters can be quickly tested by the user and the conception and predesign process is therefore of a more effective nature.

In a further embodiment an optimum solution in respect of the mathematical model is ascertained under given constraints. The model formation unit is adapted to supplement an object data model which has already been solved by a target relationship inputted by way of the user interface for the value of an output parameter. The resolution unit is adapted to produce a part-resolution plan which in comparison with the previously produced resolution plan contains only those resolution steps which concern subequation systems, the solution of which influences the output parameter which is limited by the target relationship, and, with the application of an optimization algorithm, to ascertain that parameter set which solves the equation system and fulfills the target relationship. In that respect known optimization algorithms can be used. By way of example a target parameter, an optimization mode (minimization, maximization), an optimization algorithm, free parameters and secondary conditions can be established by way of a dialog. During the optimization process the mathematical system is then repeatedly solved with a variation in the free parameters, in which respect the resolution unit is adapted to process only the part-resolution plan which is influenced by the free parameters. The outcome is an occupancy of the free parameters, which optimizes the target parameter while observing the secondary conditions.

The embodiments described hereinafter concern an enlargement of the apparatus according to the invention by the capability of producing component objects, functional objects and rule objects.

In an embodiment there is provided a component object design unit which is connected to the graphical user interface and the object database and which is adapted, in accordance with a user input at the graphical user interface, to produce a new component object or parameter object and to add a parameter object or a functional object to a new component object.

The component object design unit is preferably adapted to display on the graphical user interface a mask with mask fields for inquiry in respect of definition elements of a new parameter object or component object, to evaluate user entries in the mask fields, to produce the parameter object or component object in accordance with the entries in the mask fields and to store same in the object database. That variant saves the user the input of complex data structures and permits simple and clear, individual production of new component objects which are added to the object database. It will be appreciated that, in the context of a larger enterprise, clearance in respect of the newly produced objects in the object database for other users can be subjected to predetermined rules.

A further preferred embodiment alternatively or additionally contains a functional object design unit which is connected to the graphical user interface and the object database and which is adapted to produce a new functional object in accordance with a user input at the graphical user interface and to store the new functional object in the object database. This embodiment eliminates expensive and complicated encoding and compiling by the user.

The functional object design unit is adapted to display on the graphical user interface a mask with mask fields for inquiry of definition elements of a new functional object, to evaluate entries in the mask fields, to produce the new functional object in accordance with the entries in the mask fields and to store same in the object database.

A further embodiment contains a rule object design unit which is connected to the graphical user interface and the object database and which is adapted to produce a new rule object in accordance with a user input at the graphical user interface and to store the new rule object in the object database.

A further aspect of the invention concerns a computer software product for conceptioneering, predesign or configuration of a machine object which is represented by an object data model, containing code for implementing 1.1 an object database including
1.1.1 component objects in the form of component data models,
1.1.1.1 wherein a component object has a parameter object or a multiplicity of parameter objects which can assume a numerical or a non-numerical parameter value from a respectively predetermined range of values;
1.1.2 functional objects, wherein a respective functional object is adapted
1.1.2.1 to form a predetermined connection between two or more parameter objects of different component objects,
1.1.2.2 to modify parameter values which are contained in a component object,
1.1.2.3 to add a component object to the object data model and to set parameters values of the added component object, or
1.1.2.4 to remove a component object from the object data model,
1.2 a model formation unit
1.2.1 which is connected to the object database
1.2.2 and which is adapted
1.2.2.1 in response to the input of a corresponding instruction to produce a component object instance of a component object contained in the object database or a functional object instance of a functional object contained in the object database and to add same to an object data model,
1.2.2.2 in response to the input of an instruction for connecting various component objects together or component objects to functional objects to correspondingly modify the object data model, and
1.2.2.3 in response to the input of a corresponding instruction to characterize a parameter object as an input parameter or output parameter of a resolution process,
1.3 an execution unit,
1.3.1 which is connected to the model formation unit and to the object database
1.3.2 and which is adapted
1.3.2.1 in response to the input of a corresponding execution instruction to execute a functional object instance contained in the object data model with modification, addition or nullification of component objects, linked thereto, of the object data model,
1.4 and a resolution unit,
1.4.1 which is connected to the model formation unit and to the object database
1.4.2 and which is adapted,
1.4.2.1 on the basis of the component objects and functional objects and the connections thereof in the object data model to produce an equation system with a first number of equations and a second number of parameter objects linked by the equations,
1.4.2.2 to partition the equation system of the object data model into a number of subequation systems with a respective subamount of equations for a respective subamount of parameter objects,
1.4.2.3 in the presence of a sufficiently defined equation system to produce a resolution plan which includes a sequence of resolution steps for ascertaining the output parameters of the equation system of the object data model,
1.4.2.4 to process the resolution plan for the equation system resolution step by resolution step, wherein the processing of a respective resolution step includes the calculation of a solution of a respective subequation system by evaluation of mathematical functions or application of one or more numerical calculation algorithms, and
1.4.2.5 to output the ascertained values of the output parameters.

The computer software product of the present invention serves for implementation of the above-described apparatus on a computer system. In that respect depending on the respective application environment this can involve a single-user computer or a network formed by a plurality of computers communicating with each other.

Embodiments of the computer software product according to the invention contain code for implementation of the above-described embodiments of the apparatus according to the invention. The embodiments can be combined together.

BRIEF DESCRIPTION OF THE DRAWINGS

Further embodiments by way of example are described hereinafter with reference to the Figures in which.

DETAILED DESCRIPTION

Figure 1:
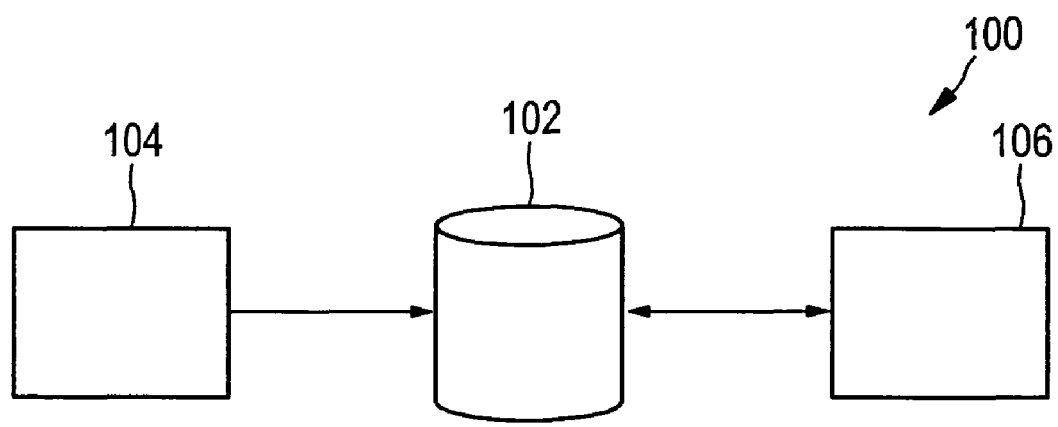
FIG. 1 shows a block diagram of a first embodiment of a design apparatus.

FIG. 1 shows an embodiment of an apparatus 100 according to the invention for conceptioneering (concept design) of a machine object. The apparatus includes an object database 102 in which predefined component objects, functional objects and rule objects are stored. To explain the terms component object, functional objects and rule object, attention is directed to the description relating to FIGS. 5 through 9.

The apparatus further includes a unit 104 referred to hereinafter as a knowledge designer. The knowledge designer is connected to the object database 102. The knowledge designer permits definition of and modification to component objects, functional objects and rule objects. Freshly created or modified objects are stored in the object database 102. In that respect the object database 102 produces for each modified object a fresh version which is characterized by a corresponding version number. By means of the knowledge designer and the object database it is therefore possible to produce and manage a library which includes all component objects, functional objects and rule objects required for the design. Later design processes can directly access the knowledge created in that way.

The apparatus 100 further includes a resolution unit 106 which is also referred to as a workbench in the context of this application. The workbench 106 forms a work platform for definition, analysis, solution and optimization of an object data model. In that respect the object data model is based on component objects, functional objects and rule objects which are in the object database 102. Besides definition of the object data model the workbench 106 permits analysis and modification thereof. The detailed structure of the workbench 106 is described more fully hereinafter with respect to FIG. 10.

Figure 2:
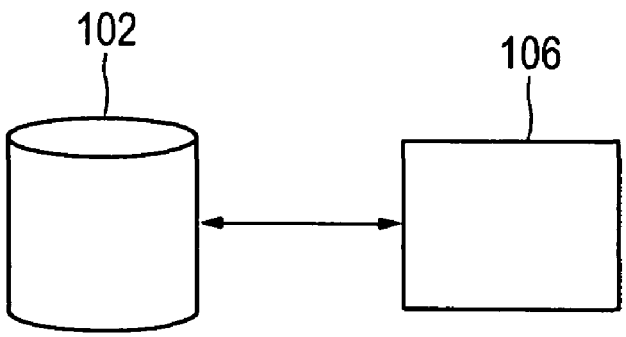
FIG. 2 shows a block diagram of a second embodiment of a design apparatus.

FIG. 2 shows an alternative structure of an apparatus according to the invention. For the sake of simplicity FIG. 2 uses the references already used in FIG. 1, where identical parts are to be identified. The FIG. 2 apparatus differs from the FIG. 1 apparatus in that it does not include a knowledge designer 104. With the apparatus of this embodiment therefore it is not possible to define new component objects, functional objects or rule objects. The design work at the workbench 106 therefore uses solely the objects already stored in the object database 102. They can be brought into play for example upon initialization of the apparatus at the manufacturer or in the context of later updating of the object database.

Figure 3:
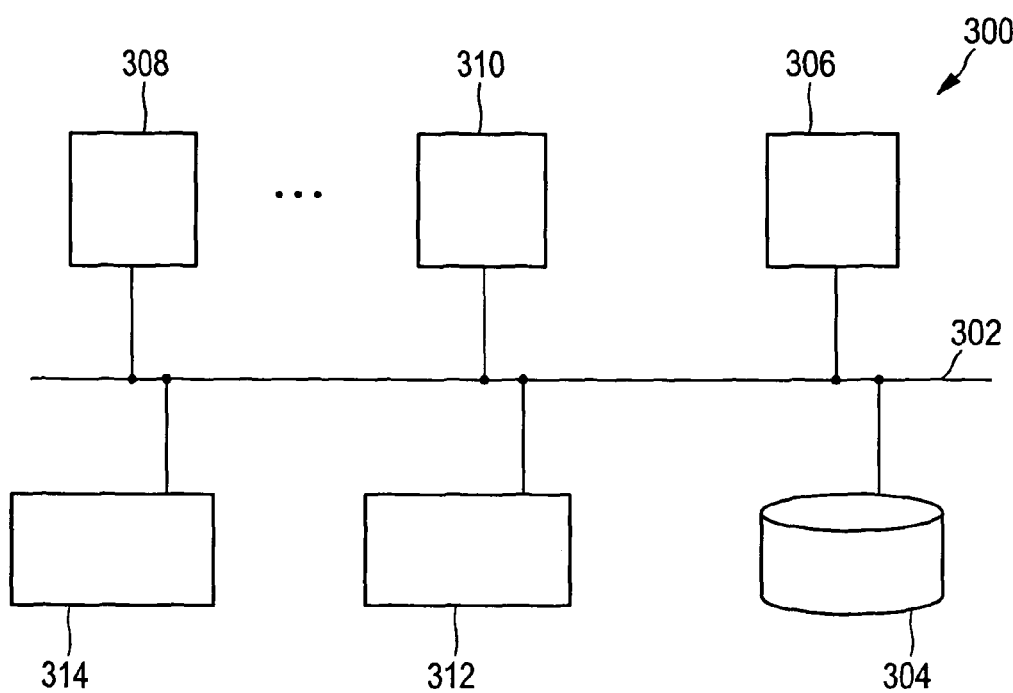
FIG. 3 shows a block diagram of a network-based design apparatus.

FIG. 3 shows a further embodiment of an apparatus according to the invention in a network structure. An object database 304, a knowledge designer 306 and a number of workbenches, symbolized representatively here by the workbenches 308 and 310, are connected together by way of network 302 for data transfer. A database server 312 and a license server 314 perform management tasks in the network 302. The database server implements a DBMS (Database Management System) and can be for example an MSDE (Microsoft SQL server desktop engine), an Oracle or a Microsoft SQL server. The Pacelab license server 314 monitors access to the object database 304 and prevents non-licensed access.

It will be appreciated that the network-based structure shown in FIG. 3 can also be embodied with a single workbench.

In a further configuration (not shown here) the object database and the workbench are installed together with a database management system or DBMS on a single workstation computer. As in the embodiment of FIG. 3 preferably MSDE is used as the DBMS. Alternatively the computer can also be equipped with Oracle or an MSSQL server. Optionally such a single-user computer additionally includes a knowledge designer.

Figure 4:
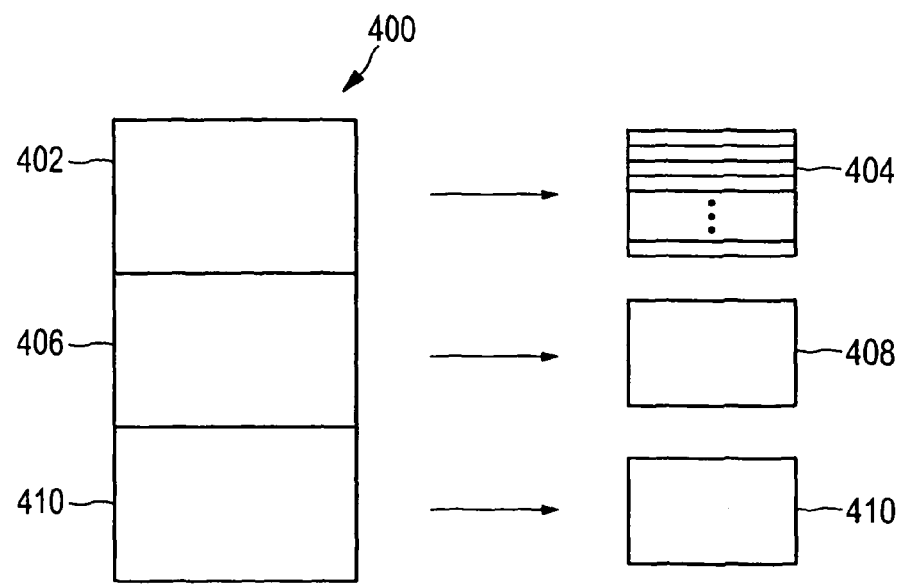
FIG. 4 shows a block diagram for describing in greater detail a system for the production of object data for an object database.

FIG. 4 shows a block diagram for further describing a system for producing objects for the object database.

The system 400 illustrated here corresponds to the knowledge designer 306 of FIG. 3 and the knowledge designer 104 of FIG. 1. The knowledge designer 400 has a three-part structure which reflects the three different types of object which can be produced. A component object designer 402 serves to produce component objects 404. A functional object designer 406 serves to produce functional objects 408. A rule object designer 410 serves to produce rule objects 410. The units 402, 406 and 410 are additionally adapted to modify the structures produced thereby. Thus for example the component object designer 402 can open a component object stored in an object database, for example the object database 304, process it and store it in the object database in the form of a new version.

The production of component objects, functional objects and rule objects in the respective units of the knowledge designer 400 is effected by means of a graphical user interface (not shown). A respective input mask facilitates re-definition of component objects, functional objects or rule objects. Steps which are traditionally required such as encoding and compilation are not required. In addition, geometrical and non-geometrical product data can be used for the production of component objects, the structure of which is described in greater detail hereinafter. For support in respect of component object design, a geometry unit (not shown) produces a geometrical model which can be used for producing visualizations which can be passed to CAD or DMU (digital mock-up) systems. The knowledge designer is in particular adapted to assist with calculations with physical units.

Figure 5:
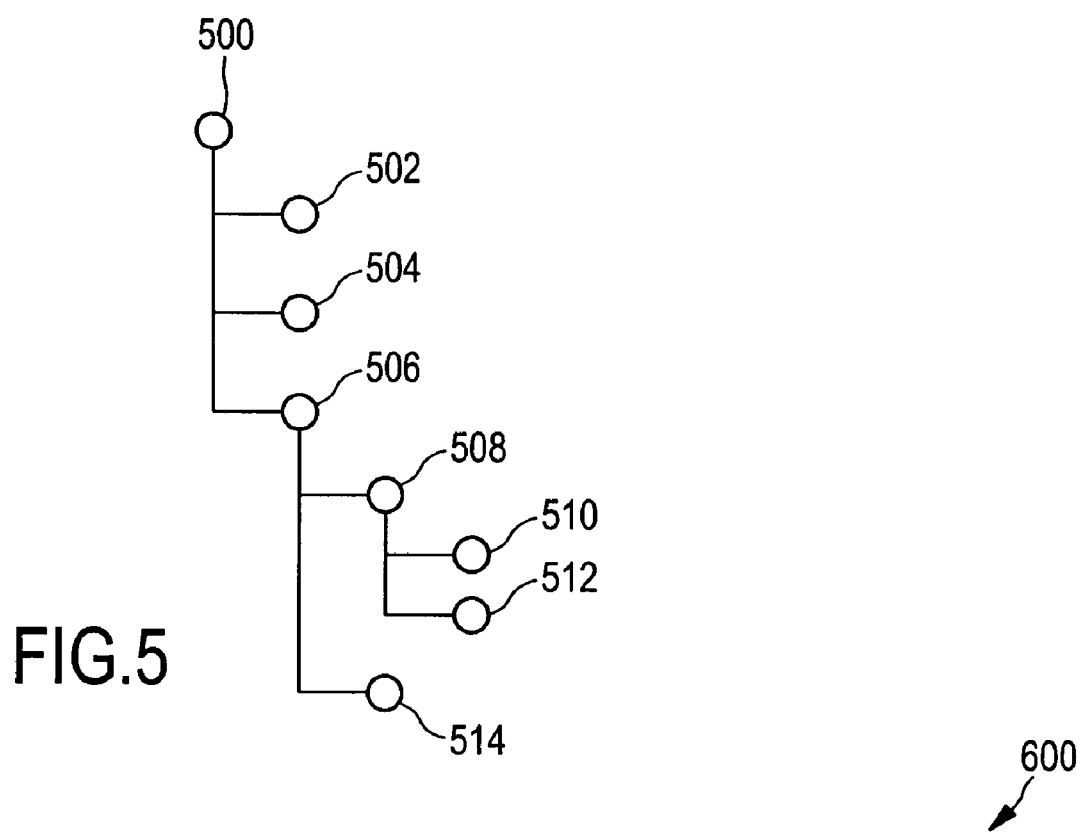
FIG. 5 shows a diagram for illustrating the structure of a component object.
Figure 6:
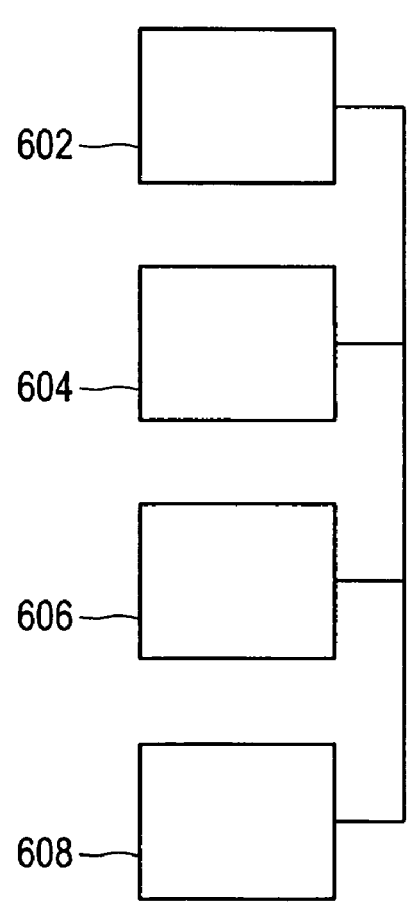
FIG. 6 shows a diagram to describe a component object concept.

FIGS. 5 and 6 which are described together hereinafter show diagrams to illustrate the structure of a component object 500 and a component object concept 600. A component object is formed by a number of subcomponent objects 502 through 512. The structure of the component object 500 is such that all relationships and data necessary for the design are included, for the description of a corresponding real machine component. It can be seen from FIG. 5 that the subcomponent objects themselves can assume the form of component objects. Thus the subcomponent object 506 is formed by further component objects 508, 510 and 512. The component object 508 is in turn formed by two subcomponent objects 510 and 512. That data structure of a component object makes it possible in a simple manner to assemble new object components from component objects of the database, which are already predefined.

Reference will be made hereinafter to FIG. 6 to describe what kinds of subcomponent objects a component object can contain. A first form of subcomponent objects is formed by parameter objects. A parameter object 602 is formed by a parameter which can assume a numerical or a non-numerical parameter value from a predetermined range of values. Numerical parameters are for example numbers of the double or floating type. In addition it is also possible to use non-numerical variables such as for example arrays and discrete variables such as for example numbers of the integer type. A parameter object can also be formed by a component object.

In addition in a preferred embodiment a component object can contain at least one formula object 604. A formula object is adapted to form a predetermined mathematical link between two or more parameter objects 602 of the component object. A dependency between given parameter objects within the same component object can therefore be specified by means of formula objects. An example of a formula object is a formula for determining the volume of an armrest of an aircraft seat by multiplication of the width, the height and the depth of the armrest.

In that respect the component object, the armrest, is defined inter alia by the parameter objects of width, height and depth. The component object armrest can form a subcomponent object of a further component object which describes a passenger seat of an aircraft.

In a preferred embodiment component objects further include at least one method object 606. Method objects are adapted to check fulfillment of a relationship between component objects of an object data model and, in dependence on the checking result, to set a value of at least one of the parameter objects embraced by the component objects in accordance with a given rule or to add to an object data model a new component object or a new subcomponent object. Method objects are implemented in the form of executable program code. A method object can serve for example in the design of a flight of stairs, in the context of a scaling operation, to monitor the height between the stair treads and, when a predetermined threshold height is exceeded, to insert an additional step in the flight of stairs.

Optionally a component object can also contain a geometry object 608 in the form of a set of geometry parameters. The geometry parameters contain items of information about a geometrical form associated with a component object or parameter object. They serve to provide a representation at a graphical user interface of the knowledge designer or the resolution unit described hereinafter.

In addition in a preferred embodiment a component object contains a structure object (not shown in FIG. 6) having a list of the subcomponent objects contained in the component object. The structure object describes the hierarchy of the subcomponent objects contained in the component object.

The illustrated hierarchical structure of the component objects corresponds to the situation to be encountered in real life in the design of complex systems, in that they are composed of separable components. By way of example an aircraft cabin consists of various cabin elements such as seats, hat racks and further elements which are assembled to constitute an overall arrangement. The modeling approach implemented by the component objects accordingly distinguishes between constraints within a component and constraints which occur between components. That encapsulation has in particular the advantage that the modeling process can be of a substantially clearer nature. In addition encapsulation permits re-use of the component objects in various systems.

By virtue of the described structure therefore complex machine objects can be organized in an intuitive fashion which also is advantageous in terms of computing engineering in the form of structural groups or assemblies. They are of a substantially more comprehensive significance than in conventional CAD systems. For, they can represent not just structures without geometrical representation (such as for example a flight altitude profile which is composed of flight segments). They also permit a dynamic (run-time) definition of the product structure. With this concept therefore in contrast to a CAD system geometry forms only an optional descriptor from a number of various descriptors of a machine object.

Figure 7:
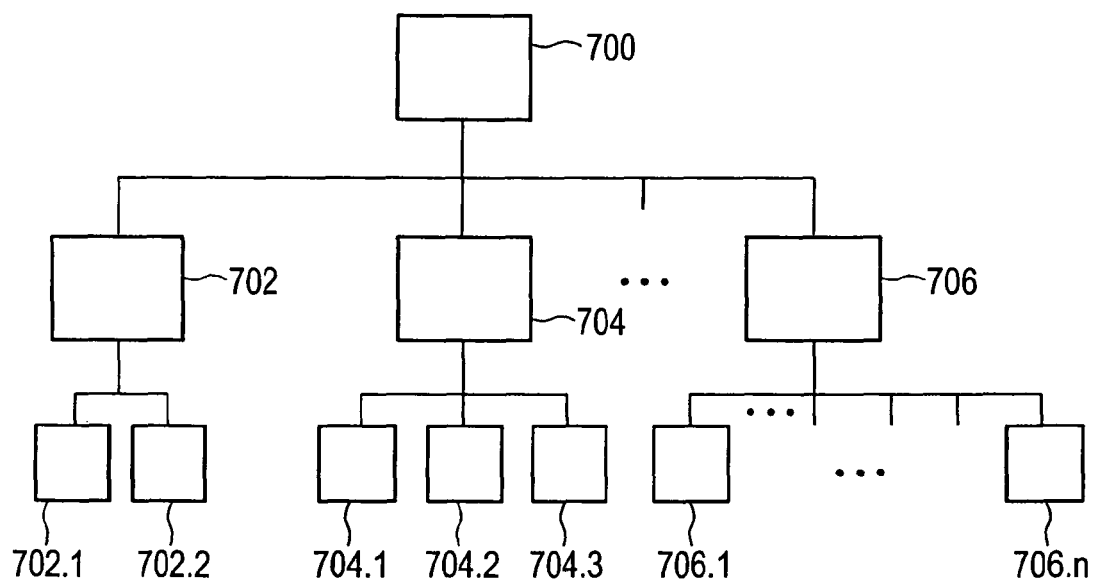
FIG. 7 shows a block diagram to describe the relationships between component object categories, component object concepts and component objects.

FIG. 7 shows a further block diagram to illustrate the relationships between component object categories, component object concepts and component objects. A component object category 700 can include a number of component object concepts 702, 704 and 706. A component object concept can be formed for example by a model for a jet engine of an aircraft. An alternative component object concept can be formed by a propeller engine. The amount of all component object concepts forms the component object category "aircraft engine". In turn different component object types can be associated with each component object concept, identified in FIG. 7 by references 702.1, 702.2 in relation to the component object concept 702, 704.1, 704.2 and 704.3 in relation to the component object concept 704 and 706.1 through 706.*n* in relation to the component object concept 706. The component object types in the above-indicated example can be for example a jet engine from a manufacturer A and a jet engine from a manufacturer B. They differ for example in respect of their weight and their air resistance so that the type of jet engine is to be taken into consideration for example when calculating the fuel consumption in relation to a flight over a predetermined distance.

Figure 8:
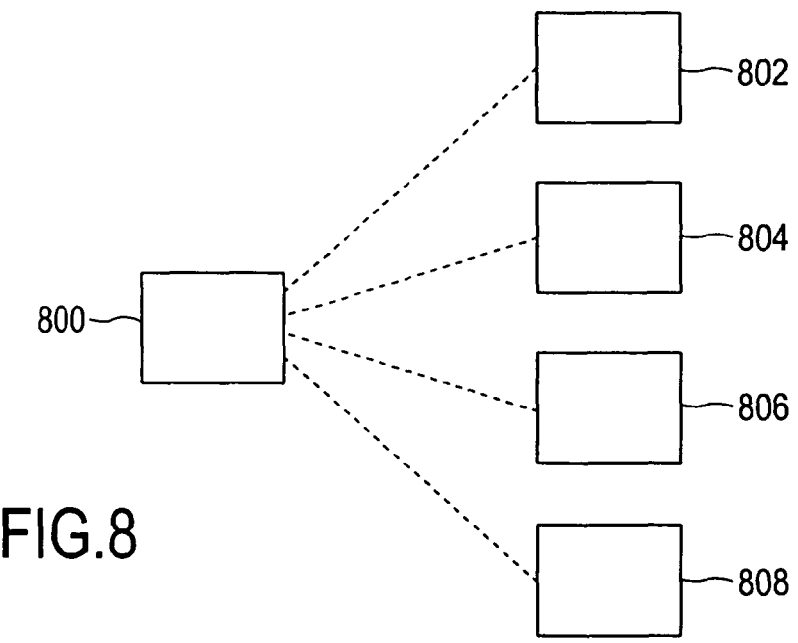
FIG. 8 shows a diagram to describe various types of functional objects.

FIG. 8 shows a diagram to explain various types of functional objects. As already explained above, functional objects form a predetermined connecting link between two or more parameter objects of different component objects. They can modify parameter values which are contained in a component object or a subcomponent object of the component object. They can add component objects to an object data model and set parameter values of the added component object. In addition functional objects can remove a component object from an object data model. Functional objects can also be used for analysis functions insofar as they record parameter values in at least one component object embraced by an object data model, and, in dependence in those values and a predefined analysis rule, they ascertain and output at least one analysis parameter value. An example of a functional object with an analysis function is ascertaining the number of seats which fit in an aircraft cabin.

Methods of that kind can be either in the form of external methods which are encoded in the form of a dll(dynamic link library)-file 802 or in the form of an Excel sheet 804 or in the form of an ODBC database 806 or in the form of an external application 808.

Figure 9:
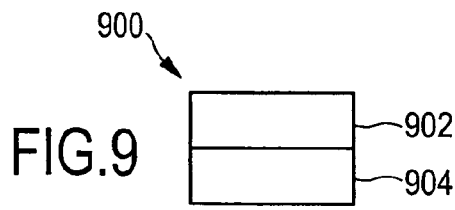
FIG. 9 shows a diagram to describe the structure of a rule object.

FIG. 9 shows the structure of a rule object. A rule object is adapted to check an object data model or a component object contained therein or a subcomponent object or the parameter objects thereof in terms of fulfillment of a predefined constraint and, in the event of non-fulfillment of the constraints, to produce a rule violation message indicating that result. A rule object therefore contains a check portion 902 which defines the condition to be fulfilled as well as an instruction portion 904 which, in the event of non-fulfillment of the condition, defines the action to be implemented, for example displaying a rule violation message.

Figure 10:
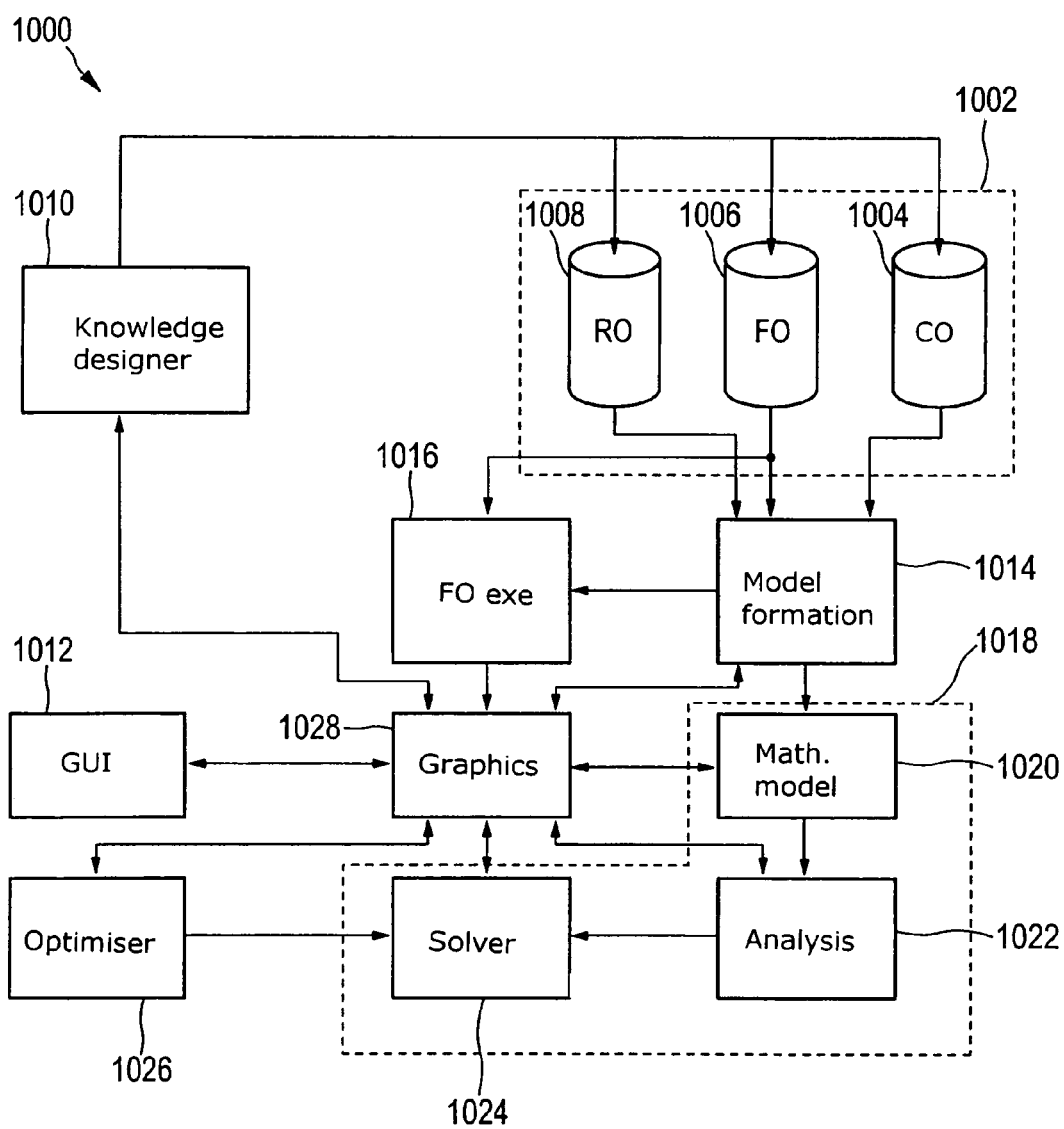
FIG. 10 shows a more detailed block diagram of a further embodiment of a design apparatus.

FIG. 10 shows a more detailed block diagram of an embodiment by way of example of an apparatus 1000 according to the invention for the conceptioneering, predesign and configuration of a machine object.

An object database 1002 stores and manages component objects 1004, functional objects 1006 and rule objects 1008. The tripartite structure of the graphic representation of the object database 1002 in FIG. 10 only serves to illustrate the three different object types which are contained therein. The object database 1002 as such does not have to be of a tripartite physical structure. The object database is connected to a knowledge designer 1010 which has already been described in greater detail hereinbefore with reference to FIG. 1.

The object database is further connected to a model formation unit 1014 and an execution unit 1016 for functional objects, hereinafter referred to as the FO-execution unit. The model formation unit provides as the output an object data model which is used for the execution of functional objects in the FO-execution unit 1016 and for a resolution process in a connected resolution unit 1018. The resolution unit 1018 includes a unit 1020 for producing a mathematical model in the form of an equation system from the object data model, an analysis unit 1022 for producing a resolution plan and a solver unit 1024 for processing the resolution plan. Furthermore in the preferred embodiment an optimizer 1026 is connected to the solver unit 1024. Finally the assembly includes a graphics unit 1028 which is arranged in the data flow between the graphical user interface 1012 and the further specified functional units.

In operation the graphical user interface 1012 in co-operation with the graphics unit 1028 permits a user of the model formation unit to provide for graphic production of an object data model. For the user that provides a workbench in which he constructs the object data model of the machine object is from prefabricated components or components he has produced himself. For that purpose as already described the user accesses component objects, functional objects and rule objects which are stored in the object database. To construct the object data model the model formation unit 1014 produces instances of the component objects, functional objects and rule objects which are selected by the user. In that respect for example it is possible to use a structure representation similar to the tree graph shown in FIG. 5. The object data model can be produced for example with manipulation of the tree graph by means of a computer mouse in that for example a selected component object is added to the object data model which is currently to be produced at a given position in the tree graph, from a graphic representation, which is also represented, of the component objects contained in the object database, by a drag and drop procedure. More detailed definition features of a component object in the context of an object data model can be inputted by way of a data mask or further graphic representations. The model formation unit 1014 makes it possible to supplement the object data model by bringing in and incorporating external method objects by way of an API.

New component objects, functional objects and rule objects can be generated in the context of the design process by way of the knowledge designer 1010 which forms a graphical user interface separate from the workbench, and they can be published in the object database 1002. The graphical user interface 1012 affords a user in this connection the option of effecting graphic inputs in connection with the production of new database objects by way of the knowledge designer 1010.

By virtue of suitable input by way of the graphical user interface 1012, the user can cause execution of functional objects by the FO-execution unit 1016, which depending on the respective functional feature are adapted for analysis or manipulation of the object data model (see above). That functionality is useful in particular in the context of configuration of machine objects and permits rapid implementation of predefined design and analysis functions.

Which parameter objects of the object data model are set as known in the context of a resolution process and which are to be ascertained in the resolution process as output parameters are also established by way of the graphical user interface 1012.

By means of a suitable instruction by way of the graphical user interface 1012, the instruction is given to the resolution unit 1018 to produce a mathematical model from the object data model. In this connection also there are provided extensive graphical supports for manipulation of the mathematical model. In that respect for example a preferably suitably labeled graphic symbol can be associated with each component object, functional object and rule object. A substructure of component objects in parameters, formulae and methods can be represented by a suitable division of the symbol or an arrangement of the various symbols for each of the subcomponents. Furthermore the connecting links between the individual objects which can be indicated by suitable connecting lines are of great significance for representing the mathematical system. In that respect arrows can represent the relationship between the respective objects (parameter x is the input parameter for determining the value of parameter y). Therefore by adding and linking symbols the user as an outcome can provide a graphic definition of a mathematical model produced by the unit 1020 for producing a mathematical model in the form of an equation system. In this case therefore there is no need for laborious symbolic input of mathematical equations of an equation system.

The analysis unit 1022 then ascertains whether the equation system is adequately defined. If that is the case the analysis unit 1022 produces a resolution plan which is communicated to the solver unit 1024. Fuller details relating to the structure and mode of operation of the analysis unit 1022 are described hereinafter with reference to FIGS. 11 through 13.

The solver unit 1024 processes the resolution plan communicated by the analysis unit 1022, resolution step by resolution step. In that respect, as will be described in greater detail hereinafter, subequation systems referred to as solver blocks are solved. The solver blocks represent irreducible partial systems. In dependence on the properties of the respective irreducible partial system which is due to be solved the solver block selects a suitable solution method. Examples of such methods are numerical solution methods based on the known Newton method, discrete solution methods, geometrical solution methods or algebraic-symbolic solution methods. All of those approaches which the solver is capable of selecting and applying permit a hybrid resolution process which can bring about resolution of the object data model with a high level of efficiency and speed.

When processing an optimization task the optimizer 1026 serves to modify parameter values using per se known optimization strategies and to input them into the resolution process in order to ascertain a solution which is the optimum one under predetermined constraints.

The illustrated comprehensive functionality of the apparatus 1000 in the course of different phases in the design of a machine object is simplified by the underlying unitary data structure. Conception, predesign and configuration are based on a unitary data model.

Figure 11:
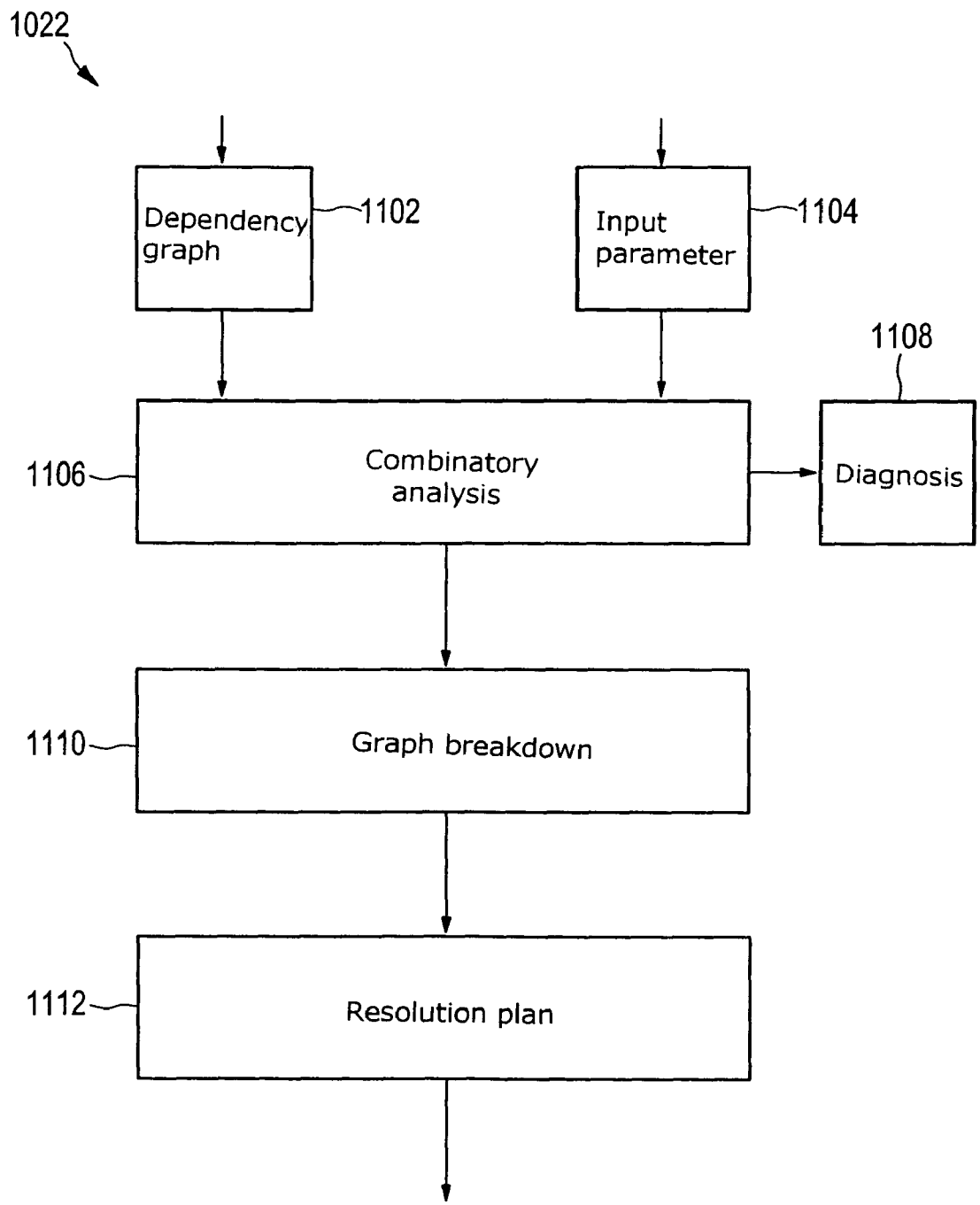
FIG. 11 shows a block diagram with closer details of the analysis unit of the resolution unit of FIG. 10.

FIG. 11 shows the structure of the analysis unit 1008 in greater detail. A dependency graph-determining means 1102 is connected to the unit 1020 and is adapted to produce a dependency graph from the mathematical system formed by the object data model. The concept of the dependency graph will be described hereinafter with reference to FIG. 12.

Figure 12:
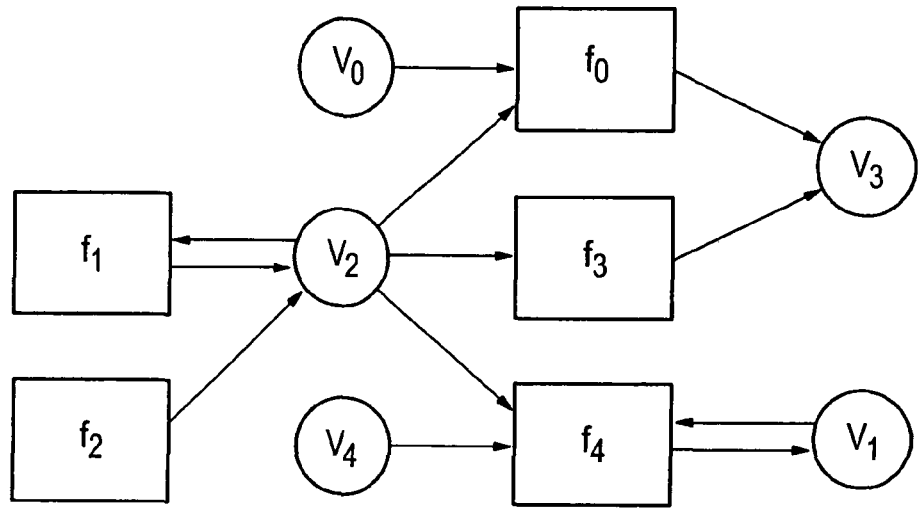
FIG. 12 shows a simple example of a dependency graph as is ascertained by the analysis unit.

FIG. 12 shows a simple example of a dependency graph. Functions are symbolically represented in the dependency graph by rectangular blocks. Circles symbolically represent variables. Arrows which point from a variable to a function indicate that the function includes the variable in question. Arrows which point from a function to a variable indicate that the variable depends by way of the function in question on the input variables thereof. The dependency graph in FIG. 12 was accordingly derived from the following equivalent equation system:

$$V2 = f1(V2)$$

$$V2 = f2(\ )$$

$$V3 = f0(V0, V2)$$

$$V3 = f3(V2)$$

$$V1 = f4(V2, V4, V1).$$

Reference is made hereinafter once again to FIG. 11. The analysis unit additionally has an input unit connected to the graphical user interface 1002 by way of the graphics unit 1004. The input unit stores instructions as to which parameter objects are to be treated as input parameters and which parameter objects as output parameters.

A combinatory analyzer 1106 is connected to the dependency graph-generating means 1102 and the input unit 1104. The combinatory analyzer 1106 is adapted to ascertain whether the mathematical system established by the dependency graph and the input and output parameters is properly defined. If there is not a properly defined system the combinatory analyzer partitions the system into a properly defined portion, an under-defined portion and an over-defined portion, if present, and analyzes the cause of under-definition or over-definition of a block of the equation system. The detected cause is outputted to a diagnosis unit 1108 which produces a corresponding detailed message and by way of the graphics unit 1004 represents an analysis image of an under-defined or over-defined partial system respectively and provides proposals for solution.

Part of the combinatory analysis is the calculation of a matching of maximum magnitude between variables and constraints. In order in that respect to take account of unidirectional constraints, matching algorithms for weighted graphs are used.

After a successful combinatory analysis the dependency graph is broken down in a graphic breakdown unit 1110 in accordance with a breakdown strategy into irreducible partial systems which can be solved individually and in a sequence. That sequence forms the resolution plan which is drawn up by the resolution plan unit 1112.

Figure 13:
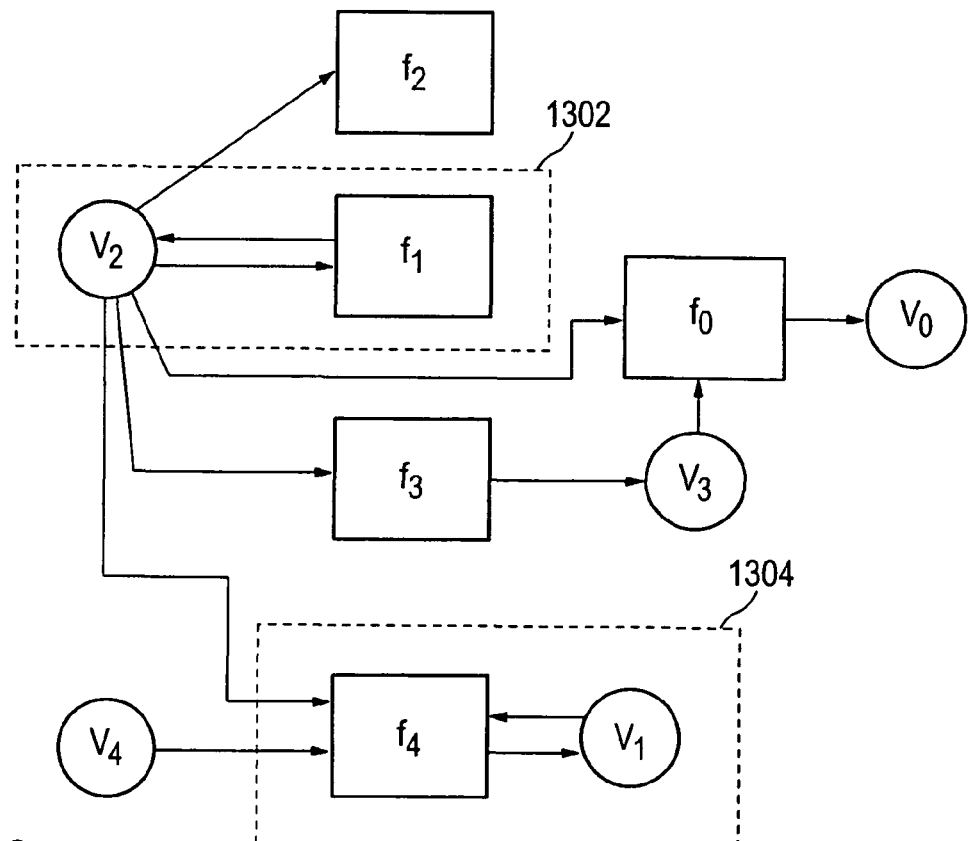
FIG. 13 shows as the result of combinatory analysis and graph breakdown in the analysis unit the system shown in FIG. 12 with a broken-down dependency graph from which a resolution plan can be derived.

FIG. 13 shows the result of a graph breakdown for the system shown in FIG. 12. Two irreducible blocks 1302 and 1304 are characterized by a broken-line border. The following resolution plan can be ascertained from the broken-down dependency graph in FIG. 13:

1. resolve the equation system 1302, f1 (V2)=V2 in accordance with the variable V2.
2. calculate V3=f3 (V2).
3. resolve equation f0 (V0, V2)=V3 in accordance with V0.
4. use a value specified by the user of V4.
5. resolve equation system 1304, f4 (V1, V4, V2)=V1 in accordance with the variable V1.
6. check whether V2=f2 ( ) is fulfilled.

If non-numerical variables are used it is not possible to provide for numerical resolution in accordance with such variables. That is correspondingly taken into consideration in the combinatory analysis procedure. For discrete variables it is possible to apply "search-and-prune" procedures or what is referred to as propagation of constraints.

An optimization strategy used by the optimizing means 1012 (FIG. 10) iterates the resolution process with a variation in the free variables in order to find reliable solutions which are optimum having regard to the specified target relationship.

The hierarchical, component-based modeling in the system according to the invention provides for encapsulation of relationships existing within a component object. Component-encompassing constraints only have access to free parameters of component objects. Component object-internal parameters which depend on free parameters are invisible outwardly.

An aircraft has frequently been referred in the present description as an example of a machine object. That however is to be interpreted without any limitative sense. Machine objects in the sense of the present invention can also be for example vessels such as rail-guided vessels and motor vehicles, but also buildings such as for example airport buildings. The specified examples form complex units. Machine objects however can also form parts of those specified examples.

In the claims hereinafter the features of the claimed apparatuses are set forth.

What is claimed is:

1. An apparatus for conceptioneering, predesign or configuration of a machine object which is represented by an object data model, comprising:

an object database including component objects in the form of component data models, wherein a component object has a parameter object or a multiplicity of parameter objects which can assume a numerical or a non-numerical parameter value from a respectively predetermined range of values; and functional objects, wherein a respective functional object is adapted to form a predetermined connection between two or more parameter objects of different component objects, to modify parameter values which are contained in a component object, to add a component object to the object data model and to set parameter values of the added component object, or to remove a component object from the object data model; and at least one processor and at least one memory including code, the at least one memory and code configured to, with the at least one processor, cause the apparatus to form:

a model formation unit which is connected to the object database and which is adapted in response to the input of a corresponding instruction to produce a component object instance of a component object contained in the object database or a functional object instance of a functional object contained in the object database and to add same to an object data model, in response to the input of an instruction for connecting various component objects together or component objects to functional objects to correspondingly modify the object data model, and in response to the input of a corresponding instruction to characterize a parameter object as an input parameter or output parameter of a resolution process;

an execution unit for functional objects which is connected to the model formation unit and to the object database and which is adapted in response to the input of a corresponding execution instruction to execute a functional object instance contained in the object data model with modification, addition or nullification of component objects, linked thereto, of the object data model; and a resolution unit which is connected to the model formation unit and to the object database and which is adapted, on the basis of the component objects and functional objects and the connections thereof in the object data model to produce an equation system with a first number of equations and a second number of parameter objects linked by the equations, to partition the equation system of the object data model into a number of subequation systems with a respective subamount of equations for a respective subamount of parameter objects, in the presence of a sufficiently defined equation system to produce a resolution plan which includes a sequence of resolution steps for ascertaining output parameters of the equation system of the object data model, to process the resolution plan for the equation system resolution step by resolution step, wherein the processing of a respective resolution step includes the calculation of a solution of a respective subequation system by evaluation of mathematical functions or application of one or more numerical calculation algorithms, and to output the ascertained values of the output parameters of the equation system.

2. The apparatus as set forth in claim 1, wherein a parameter object, contained in the object database, of a component object is formed by a further component object with at least one further parameter object.

3. The apparatus as set forth in claim 2, wherein the resolution unit has a solver diagnosis unit which is adapted during the processing of a resolution step to monitor the convergence of a solution in respect of the subequation system in question to a convergence value, and in the absence of convergence to break off processing of the resolution step and to output a diagnosis message identifying the subequation system in question.

4. The apparatus as set forth in claim 1, wherein a component object contained in the object database additionally contains a structure object which contains a list of the further component objects contained in the component object.

5. The apparatus as set forth in claim 1, wherein a component object contained in the object database additionally contains at least one formula object which is adapted to form a predetermined mathematical link between two or more parameter objects of the component object.

6. The apparatus as set forth in claim 1, wherein a component object contained in the object database additionally contains at least one method object which is adapted to check the fulfillment of a relationship between parameter objects of the component object and in dependence on the checking result to set a value of at least one of the parameter objects embraced by the component object in accordance with a predetermined rule or to add to an object data model a new component object or subcomponent object.

7. The apparatus as set forth in claim 1, wherein the object database contains at least one rule object which is adapted to check the object data model or a component object or subcomponent object contained therein or parameter values thereof for the fulfillment of a predefined constraint.

8. The apparatus as set forth in claim 1, wherein the model formation unit is connected to a graphical user interface and includes a graphics unit which is adapted on the basis of instructions received by way of the graphical user interface to produce or modify a graphic representation of the object data model which for each component object, each formula object and each rule object of the object data model and each link between them has a respective predetermined graphic element, and to output the graphic representation to the graphical user interface.

9. The apparatus as set forth in claim 8 wherein the graphics unit is adapted to produce a graphic representation of a number of component objects and functional objects contained in the object database and to output same to the graphical user interface and to output a graphic representation of the object data model, which reflects all component objects contained therein and a component object hierarchy defined by the structure objects contained therein.

10. The apparatus as set forth in claim 8, wherein the resolution unit has a resolution diagnosis unit which is connected to the graphical user interface and which is adapted to ascertain whether the object data model is adequately defined for the calculation of a solution, when there is an under-defined subequation system to ascertain all parameter objects and/or equations contained in the under-defined subequation system, and to produce a diagnosis message which identifies the ascertained parameter objects or equations respectively and to output same for display at the graphical user interface.

11. The apparatus as set forth in claim 8, wherein the resolution diagnosis unit is additionally adapted when there is an over-defined subequation system to ascertain all parameter objects and/or equations contained in the over-defined subequation system and to produce a diagnosis message which identifies the ascertained parameter objects or equations respectively and to output same for display at the graphical user interface.

12. The apparatus as set forth in claim 11, wherein the graphics unit is adapted to produce a graphic representation of the ascertained parameter objects and equations and the connecting link thereof and to output same to the graphical user interface for joint representation with the diagnosis message.

13. The apparatus as set forth in claim 8, wherein the graphics unit is additionally adapted to produce and output an impact graphic which contains a graphic representation of all component objects, formula objects and rule objects which are directly or indirectly linked to a parameter object which can be selected by way of the user interface.

14. The apparatus as set forth in claim 8, wherein the graphics unit is additionally adapted
to produce and output a computation graphic which contains a graphic representation of all component objects, formula objects and rule objects which are directly or indirectly involved in the calculation of a parameter value of a parameter object which can be determined by way of the user interface as an output parameter.

15. The apparatus as set forth in claim 8, wherein the functional object design unit is adapted on the graphical user interface
to display a mask with mask fields for the inquiry of definition elements of a new functional object, and
to evaluate entries in the mask fields, to produce the new functional objects corresponding to the entries in the mask fields and to store same in the object database.

16. The apparatus as set forth in claim 8, wherein the knowledge designer contains a rule object design unit
which is connected to the graphical user interface and the object database and
which is adapted in accordance with a user input at the graphical user interface to produce a new rule object and to store the new functional object in the object database.

17. The apparatus as set forth in claim 1, wherein the resolution unit is additionally adapted
after an output of the ascertained values of the output parameters upon application of a modified input parameter set for the object data model at the instruction interface to ascertain modified input parameters of the input parameter set
and then to produce a partial resolution plan which in comparison with the previously produced resolution plan contains only those resolution steps which concern subequation systems, the solution of which directly or indirectly depends on the modified input parameter or parameters.

18. The apparatus as set forth in claim 17, wherein the model formation unit is adapted
to supplement an object data model which has already been solved by a target relationship inputted by way of the user interface for the value of an output parameter and
wherein the resolution unit is adapted
to produce a partial resolution plan which in comparison with the previously produced resolution plan contains only those resolution steps which concern subequation systems, the solution of which influences the output parameter limited by the target relationship, and
with the application of an optimization algorithm to ascertain that parameter set which solves the equation system and fulfills the target relationship.

19. The apparatus as set forth in claim 1, wherein a component object contains a geometry object in the form of a set of geometry parameters which have items of information about a geometrical form associated with the first parameter object, and wherein the graphics unit is adapted
on the basis of the input parameter values and the ascertained output parameter values of an object data model to determine values of the geometry parameters of all parameter objects
and to produce a model graphic corresponding to the geometrical form of the machine object with the ascertained geometry parameters.

20. The apparatus as set forth in claim 1 further comprising a knowledge designer,
which includes a component object design unit,
which is connected to a graphical user interface and the object database,
and which is adapted
in accordance with a user input at the graphical user interface to produce a new component object or parameter object and
to add a parameter object or a functional object to a new component object.

21. The apparatus as set forth in claim 20, wherein the component object design unit is adapted
on the graphical user interface to display a mask with mask fields for the inquiry of definition elements of a new parameter object or component object, and
to evaluate user entries in the mask fields, to produce the parameter object or component object corresponding to the entries in the mask fields and to store same in the object database.

22. The apparatus as set forth in claim 1, wherein the knowledge designer contains a functional object design unit,
which is connected to a graphical user interface and the object database, and
which is adapted in accordance with a user input at the graphical user interface to produce a new functional object and to store the new functional object in the object database.

23. A non-transitory computer readable storage medium containing computer executable instructions, said executable instructions when executed by a processor are configured to perform conceptioneering, predesign or configuration of a machine object represented by an object data model and further generating:
an object database including
component objects in the form of component data models, wherein a component object has a parameter object or a multiplicity of parameter objects which can assume a numerical or a non-numerical parameter value from a respectively predetermined range of values, and functional objects, wherein a respective functional object is adapted to form a predetermined connection between two or more parameter objects of different component objects,
to modify parameter values which are contained in a component object, to add a component object to the object data model and to set parameter values of the added component object, or to remove a component object from the object data model;
a model formation unit which is connected to the object database and which is adapted in response to the input of a corresponding instruction to produce a component object instance of a component object contained in the object database or a functional object instance of a functional object contained in the object database and to add same to an object data model, in response to the input of an instruction for connecting various component objects together or component objects to functional objects to correspondingly modify the object data model, and in response to the input of a corresponding instruction to characterize a parameter object as an input parameter or output parameter of a resolution process;
an execution unit for functional objects which is connected to the model formation unit and to the object database and which is adapted in response to the input of a corresponding execution instruction to execute a functional object instance contained in the object data model with modification, addition or nullification of component objects, linked thereto, of the object data model; and a resolution unit which is connected to the model formation unit and to the object database and which is adapted on the basis of the component objects and functional objects and the connections thereof in the object data model to produce an equation system with a first number of equations and a second number of parameter objects linked by the equations, to partition the equation system of the object data model into a number of subequation systems with a respective subamount of equations for a respective subamount of parameter objects, in the presence of a sufficiently defined equation system to produce a resolution plan which includes a sequence of resolution steps for ascertaining the output parameters of the equation system of the object data model, to process the resolution plan for the equation system resolution step by resolution step, wherein the processing of a respective resolution step includes the calculation of a solution of a respective subequation system by evaluation of mathematical functions or application of one or more numerical calculation algorithms, and to output the ascertained values of the output parameters.

* * * * *